(12) United States Patent
Dudt et al.

(10) Patent No.: US 10,639,696 B1
(45) Date of Patent: May 5, 2020

(54) APPARATUS AND METHOD FOR OUTER SURFACE ENHANCEMENT AND COMPACTION OF A CYLINDRICAL STRUCTURE USING GLASS FAILURE GENERATED PULSE

(71) Applicants: Philip Dudt, North Bethesda, MD (US); Roshdy George Barsoum, McLean, VA (US)

(72) Inventors: Philip Dudt, North Bethesda, MD (US); Roshdy George Barsoum, McLean, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 162 days.

(21) Appl. No.: 15/719,868

(22) Filed: Sep. 29, 2017

(51) Int. Cl.
  *B21D 26/08* (2006.01)
  *C21D 1/06* (2006.01)
  *C21D 10/00* (2006.01)

(52) U.S. Cl.
  CPC ............... *B21D 26/08* (2013.01); *C21D 1/06* (2013.01); *C21D 10/00* (2013.01)

(58) Field of Classification Search
  CPC .......... B21D 26/06; B21D 26/08; C21D 1/06; C21D 1/09; C21D 10/00
  USPC ............................................ 72/53, 56, 61, 62
  See application file for complete search history.

(56) References Cited

U.S. PATENT DOCUMENTS

| | | | | |
|---|---|---|---|---|
| 2,629,325 A * | 2/1953 | Sweetman | ................ | F42B 3/08 102/310 |
| 3,252,312 A * | 5/1966 | Maier | ..................... | B21D 26/08 72/56 |
| 3,661,004 A * | 5/1972 | Lee | ........................ | B21D 26/08 72/56 |
| 3,751,954 A * | 8/1973 | Ezra | ....................... | B21C 37/06 72/56 |
| 2011/0309074 A1* | 12/2011 | Thunhorst | ................. | F17C 1/16 220/23.9 |
| 2012/0273095 A1* | 11/2012 | Masek | ..................... | C21D 8/10 148/654 |

* cited by examiner

*Primary Examiner* — Adam J Eiseman
*Assistant Examiner* — Stephen Floyd London
(74) *Attorney, Agent, or Firm* — Dave Ghatt

(57) ABSTRACT

An apparatus and method for treatment of articles, using glass failure generated pulses. The apparatus and method is directed towards the hardening and compaction of an elongated cylindrical article surrounded by a glass sleeve in a confined arrangement. The apparatus includes a striker for striking the glass sleeve to create an explosive reaction that pressure-treats the cylindrical article, thereby causing the hardening and compaction.

14 Claims, 3 Drawing Sheets

APPARATUS AND METHOD FOR OUTER SURFACE ENHANCEMENT AND COMPACTION OF A CYLINDRICAL STRUCTURE USING GLASS FAILURE GENERATED PULSE

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

CROSS-REFERENCE TO RELATED APPLICATIONS

This application is related to the pending U.S. Non Provisional patent application, application Ser. No. 15/719, 951 filed concurrently with the instant application, herein incorporated by reference, entitled "Apparatus and Method for Outer Surface Enhancement and Compaction of a Spherical Structure Using Glass Failure Generated Pulse," by inventors Philip Dudt and Roshdy George Barsoum.

This application is related to the pending U.S. Non Provisional patent application, application Ser. No. 15/720, 033 filed concurrently with the instant application, herein incorporated by reference, entitled "Apparatus and Method for Outer Surface Enhancement and Compaction of an Object Using Glass Failure Generated Pulses in an Explosive Arrangement," by inventors Philip Dudt and Roshdy George Barsoum.

This application is related to the pending U.S. Non Provisional patent application, application Ser. No. 15/720, 111 filed concurrently with the instant application, herein incorporated by reference, entitled "Apparatus and Method for Inner Cylindrical Surface Enhancement and Compaction of a Structure Using Glass Failure Generated Pulse," by inventors Philip Dudt and Roshdy George Barsoum.

TECHNICAL FIELD

The following description relates generally to an apparatus and method for treating articles, using glass failure generated pulses. In particular, the apparatus and method is directed towards the hardening and compacting of an elongated cylindrical vessel, surrounding by a glass sleeve in a confined arrangement, the apparatus also including a striker assembly for striking the glass sleeve to generate a desired pulse.

BACKGROUND

There is always a need for stronger and harder alloys to improve the performance and lifetime of structures and platforms. Engineers are looking for high strength materials to improve performance and safety, while maintaining low weight requirements. Strength limitations directly affect how industrial parts are used. Engineers are actively looking for alloys with material properties sufficient for manufacturing and use, while providing fatigue, fracture, and corrosion resistance, while maintaining or improving mechanical properties.

Fatigue and fracture strengths of machinery parts, non-moving parts such as gun barrels, and weldments can be improved by generating high compressive strengths on their surface. The benefit is that the compressive stresses must be overcome before tension strains can be produced leading to crack initiation and extension. A number of known methods are used industrially for enhancing the surface strength profile. This includes the application of plastic stresses imparted using large rolling machines, carbonizing, shot peening, and explosive detonation.

Many industrial parts, which cannot be otherwise produced by casting, rolling or forging can be fabricated using powder metallurgy techniques. The parts, such as gears, shafts, and brackets etc., are compacted and the powder with matrix portions are bonded together using hot isostatic pressing (HIP), along with follow-on heat application. Dynamically compressing parts under high dynamic loading is a useful process.

Another known technique for treating the surfaces of industrial parts to improve fatigue and fracture properties is shot peening. This technique enables a rise in the hardness of a surface layer of a work piece and introduction of compressive residual stress into the surface layer. This technique is widely used in the industrial fields of automobiles, aircrafts, etc.

Yet another known technique is laser shock hardening. This involves irradiating the surface of a solid material, such as a metal or a ceramic, with pulsed laser beam through a liquid to adjust surface of internal characteristics of the material, such as structure, hardness and residual stress.

Generally speaking, laser shock hardening has a higher effect than shot peening and in addition has various excellent advantages that shot peening does not have, such as capability of contactless operation, no involvement of reaction force and capability of precise control of laser irradiation conditions and laser irradiation sites. Even with all these known techniques, it is still desired to have a method and an apparatus to improve the ability to strengthen and to make more compact, the surface of industrial parts. Such a method may also be used to supplement other forms of surface hardening, such as carburizing, nitriding and cyaniding.

SUMMARY

In one aspect, the invention is a system for surface hardening and compacting a structure. The system includes a confinement assembly. In this aspect, the confinement assembly includes a shaft having a longitudinal axis, a glass sleeve surrounding and contacting the shaft, a rigid outer shell encasing the glass sleeve and the shaft therewithin. The system also includes a striker assembly. The striker assembly has a flat backing portion, a protrusion portion extending from the flat backing portion, a launching mechanism for launching and directing the striker assembly in a direction parallel to the longitudinal axis at a high velocity towards the confinement assembly so that the one or more protrusion portions strike the glass sleeve, to shatter the glass of the glass sleeve to create an explosive volume expansion of the glass, which due to the confinement assembly results in a compressive force being applied to the surface of the shaft, thereby hardening the surface of the shaft. The invention can also produce polymorphic silicate content through shock loading of confined glass to further improve hardening properties.

In another aspect, the invention is a method of hardening and compacting a cylindrical structure. The method includes the providing of a confinement assembly. According to the invention, the confinement assembly includes a cylindrical structure having a longitudinal axis, a glass sleeve surrounding and contacting the shaft, and a rigid outer shell encasing the glass sleeve and the cylindrical structure therewithin. In this aspect, the method also includes the providing of a striker assembly. The striker assembly includes a flat backing portion, and a protrusion portion extending from the flat backing portion. The method also includes, directing the striker assembly towards the confinement assembly in a direction substantially parallel to the longitudinal axis, so that the protrusion portion strikes the glass sleeve, to shatter the glass of the glass sleeve, thereby creating an explosive expansion of the glass. In this aspect, due to the limited space within the confinement assembly, compressive forces are created and applied to the surface of the cylindrical structure, thereby accomplishing said hardening and compacting of the cylindrical structure.

BRIEF DESCRIPTION OF THE DRAWINGS

Other features will be apparent from the description, the drawings, and the claims.

DETAILED DESCRIPTION

Figure 1A:
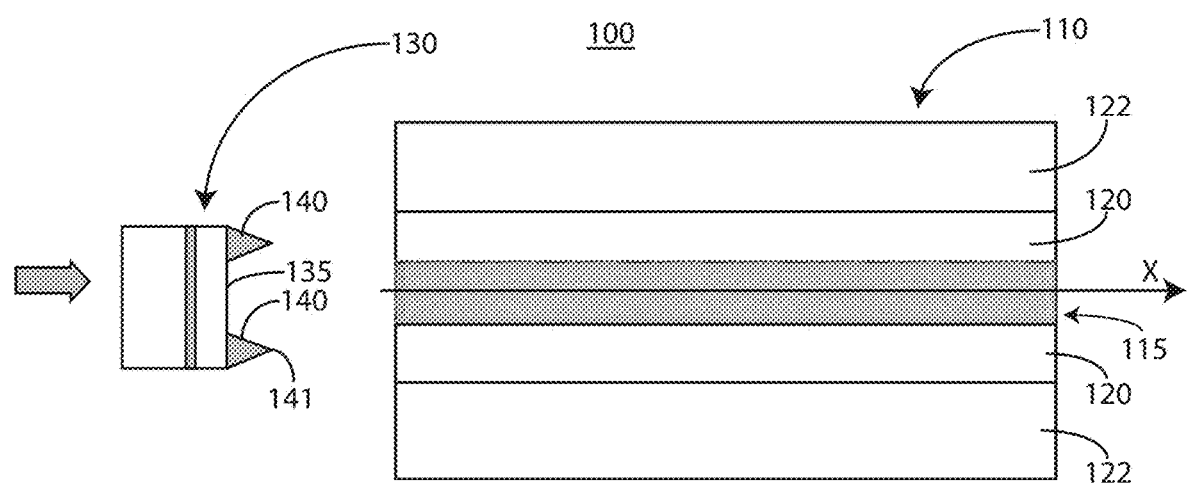
FIG. 1A is an exemplary sectional view of a system for hardening and compacting a cylindrical structure, according to an embodiment of the invention.

FIG. 1A is an exemplary sectional view of a system 100 hardening and compacting a cylindrical structure, according to an embodiment of the invention. As shown, the system includes a confinement assembly 110 and a striker assembly 130. The confinement assembly includes a cylindrical structure which is a shaft 115 having a longitudinal axis X. The shaft is to be hardened and compacted, as outlined below. The shaft 115 may be made from metallic materials such as 1015 steel, 4140 steel, and the like. The shaft 115 may be used as an industrial part in a mechanical operation, for example, and thus may be sized in accordance with the application. Thus, for example, the shaft 115 could be part of a propulsion assembly in a ship, including the propeller, or a drive shaft in a vehicle. The shaft 115 could vary in size, for example having a diameter of about 0.5 inches to about 3.0 inches in diameter.

The confinement assembly 110 also includes a glass sleeve 120 surrounding and contacting the shaft 115. According to one embodiment of the invention, the glass sleeve 120 is a solid glass sleeve. According to another embodiment of the invention, the glass sleeve 120 is made up of densely packed glass particles. The glass may be for example, any known type of glass such as silica glass, fused silica, fluoride glass, alumino silicate glass, phosphate glass, borosilicate glass, or flint glass. The glass sleeve 120 may include solid or densely packed glass particles. FIG. 1A also shows a rigid outer shell 122 encasing both the glass sleeve 120 and the shaft 115. The rigid outer shell 122 may be a thick containment vessel, such as a gun barrel, for example.

Figure 1B:
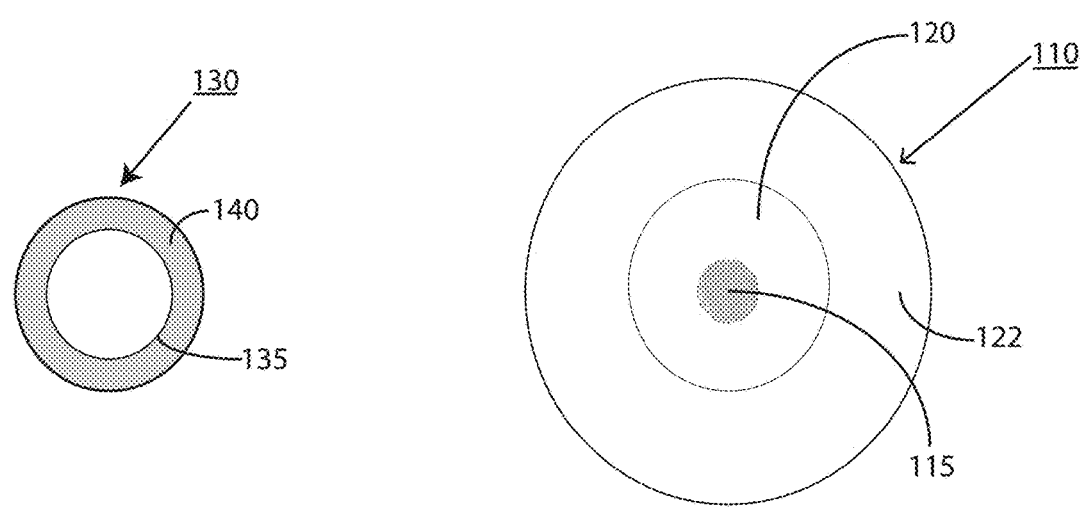
FIG. 1B is an exemplary front view of the confinement assembly and the striker assembly of a system for hardening and compacting a shaft, according to an embodiment of the invention.

FIG. 1A also shows a striker assembly 130 having a flat backing portion 135. FIG. 1A also shows protrusion portion 140 extending from the flat backing portion 135. As shown, the protrusion portion 140 has a triangular profile, having a pointed tip 141 for impacting the glass. FIG. 1B is an exemplary front view of the confinement assembly 110 and the striker assembly 130 of the system hardening and compacting a cylindrical structure, according to an embodiment of the invention. The illustration of FIG. 1B shows that in the confinement assembly 110, the cylindrical structure, shaft 115, is surrounded by the glass sleeve 120, which is surrounded by the rigid outer shell 122, in a concentric arrangement. The front view of FIG. 1B also shows the protrusion 140 at an outer circumference region of the backing portion, forming a circular protrusion ring.

As outlined below, the striker assembly 130 is used to shatter the glass of the glass sleeve 120 to create an explosive volume expansion of the glass. Partly due to the confinement of the glass in the confinement assembly 110, upon impact by the protrusion portion 140 on the glass, a compressive force acts on the surface of the shaft 115, thereby hardening the surface of the shaft 115.

Figure 1C:
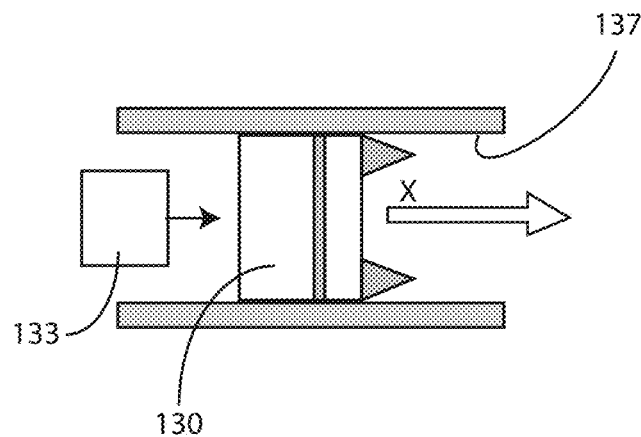
FIG. 1C is a simplified exemplary illustration of a launching mechanism for launching the striker assembly, according to an embodiment of the invention.

The striker assembly 130 could be launched by a known mechanism, such as a gas gun, contact explosive, or by a drop weight device. FIG. 1C is a simplified exemplary illustration of a launching mechanism for launching the striker assembly 130, according to an embodiment of the invention. The launching mechanism includes a cylindrical passage 137 that complements the shape of the striker assembly 130, and is aligned to direct the striker assembly 130 towards the confinement assembly 110 in a direction parallel or substantially parallel to the longitudinal axis X so that the protrusion portion 140 strikes the glass sleeve 120.

The launching mechanism includes a device, charge, explosive, or the like for launching the striker assembly. This mechanism is shown schematically as element 133, and may be a projectile component that is a part of a known gun, such as a gas gun or a rail gun, which impacts the striker assembly 130. Alternatively element 133 may represent an explosive charge. Explosive charges of pentotite, C-4, or other known explosives are applicable, with charge sizes of the order of about 0.0625 to about 0.5 lbs. are applicable.

When set in motion by these known firing components, such by impact from projectile component 133 or by direct gas or rail gun or explosive, the striker assembly 130 may be set in motion at speeds of about 500 feet per second to about 20,000 feet per second.

Figure 1D:
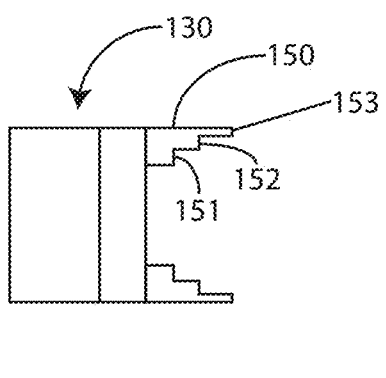
FIGS. 1D and 1E are exemplary illustrations of striker assemblies having alternative stepped protrusion portions, according to embodiments of the invention.
Figure 1E:
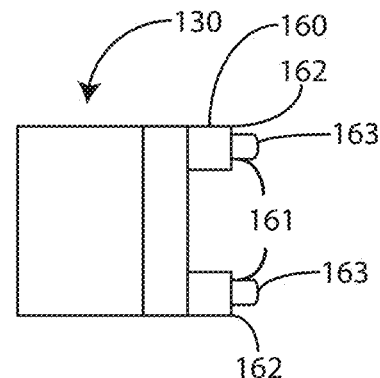

FIGS. 1D and 1E are exemplary illustrations of striker assemblies 130 having alternative stepped protrusion portions. FIG. 1D shows the striker assembly 130 having a protrusion portion 150 having a 3-step profile, with steps 151, 152, and 153. In operation, the flat step portion 153 makes initial contact with the glass, in a manner similar to the point 131 in the embodiment of FIGS. 1A and 1B. As outlined below, this design provides a more continuous force field of failure waves, as compared to the triangular protrusion portion 140. As with the protrusion portion 140 shown in FIGS. 1A and 1B, the protrusion portion 150 extends as a ring, around the circumference at the flat backing portion 135.

Figure 1F:
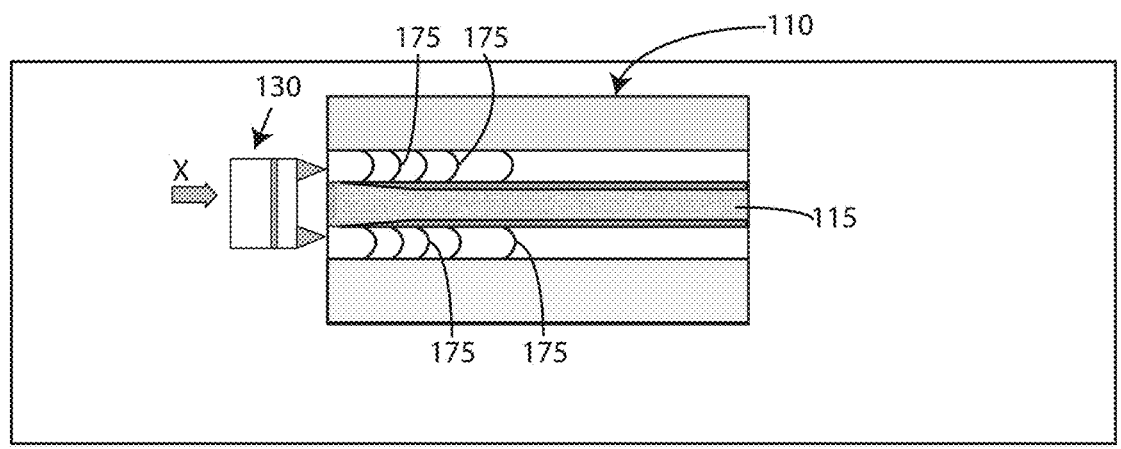
FIG. 1F is an exemplary explanatory illustration of a system for hardening and compacting a shaft, according to an embodiment of the invention

FIG. 1F shows the striker assembly 130 having a protrusion portion 160 having a 2-step profile, with steps 161, 162, and a slightly curved top contact portion 163. In operation, the slightly curved top contact portion 163 makes initial contact with the glass, in a manner similar to the point 131 in the embodiment of FIGS. 1A and 1B. As outlined below, this design provides a more continuous force field of failure waves.

In operation, the striker assembly 130, moving at a high velocity in direction X as shown by the arrows in FIGS. 1A, 1C, and 1F, impinges on the glass sleeve 120, with the protrusion portions (140, 150, 160) making contact with the glass. The striker assembly 130 contacts the glass while moving at speeds between 500 feet per second to about 20,000 feet per second. This generates explosive forces for several reasons. First, due to the phenomenon called "Reynolds Dilatancy" in which multiple cracks force the volume occupied to increase as the cracks rupture and expand the molecular structure. The glass experiences this Reynolds Dilatancy when impacted by the high velocity striker assembly 130. The pressure created by the ruptured glass within the confined area of the confinement assembly 110, serves to pressurize the shaft 115, thereby hardening and compacting the shaft 115. Shafts that are treated as outlined above could have different sizes. For example, the shaft 115 may have a diameter of about 0.5 inches to about 3.0 inches.

Additionally, the impact by the high velocity striker assembly, and particularly the impact of the protrusion portions (140, 150, 160) on the glass causes failure waves. FIG. 1C is an exemplary explanatory illustration of a system 100 for hardening and compacting a cylindrical structure, according to an embodiment of the invention. FIG. 1C shows the failure waves 175, which are waves that propagate so the glass material is intact ahead of the wave and comminuted behind the wave. In embodiments in which the glass sleeve 120 comprises glass particles, it is preferred that the glass particles are more granulated, as opposed to fine powdered, in order to create more substantial failure waves 175. The large amount of kinetic energy stored ahead of the wave must then appear in comminuted form. The failure is explosive, and due to the confined area of the confinement assembly 110, creates intense pressurization forces on the shaft 115. This hardens and compacts the shaft 115. It should be noted that embodiments that include the stepped protrusion portions 150 and 160, more continuous or additional waves are created, which can provide a control on the pressurization forces, and timing of the waves. In essence, there is more control of the level and timing of the explosive waves to control the duration features of the pulse. The level of applied impulse (pressure over time) can affect the polymorphic transitions in the glass.

The impact by the high velocity striker assembly 130 on the glass may involve a third phenomenon which occurs when the high velocity impact of the striker assembly 130 on the glass is so forceful that coesite, stishovite, or seifertite, which are denser forms of silicate, are created. Stishovite has a density of about 4.6 gm/cc as compared to 2.6 gm/cc. It is understood that when the stishovite-type polymorphs rupture they may convert to an amorphous state. It is generally understood that polymorphs that initially form under the high pressure in the glass have smaller volume contents. Then they appear to revert to the larger volume condition, this volume change helping to create the bulking. This rebound effect increases the applied pressure via the volume expansion.

On average, due to the different phenomenon outlined above, i.e., on account of Reynolds's Dilatancy, the formation of failure waves, and the creation of coesite or stishovite, the volume expansion could be up to 40 percent or even greater. Specifically regarding stishovite, expansions of around 77 percent at high pressures may occur. It should be noted that only a limited amount of the material would likely change to this polymorph. Again, as stated above, due to the confined area of the confinement assembly 110, the explosive volume expansion created by the striker assembly 130 impacting the glass creates intense pressurization forces on the shaft 115. This results in the hardening and compacting of the shaft 115, with higher and more intense pressures created with the formation of coesite, stishovite, and seifertite, producing a more hardened shaft 115.

Figure 2:
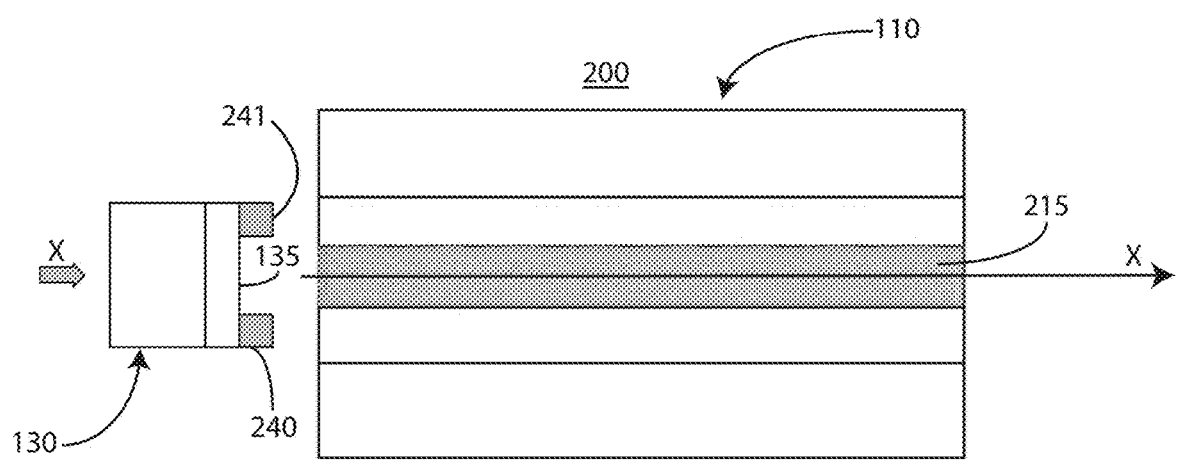
FIG. 2 is an exemplary sectional view of a system for hardening and compacting a cylindrical structure, according to an embodiment of the invention.

FIG. 2 is an exemplary sectional view of a system 200 for hardening and compacting a cylindrical structure 215, according to an embodiment of the invention. The system 200 shown in FIG. 2 is similar to the system 100 shown in FIG. 1A, and identical parts are numbered accordingly. Thus, as in FIG. 1A, 110 represents a confinement assembly, which includes a glass sleeve 120 surrounding and contacting the shaft 115. According to one embodiment of the invention, the glass sleeve 120 is a solid glass sleeve. According to another embodiment of the invention, the glass sleeve 120 is made up of densely packed glass particles. The glass sleeve 120 may be for example, any known type of glass such as silica glass, fused silica, fluoride glass, alumino silicate glass, phosphate glass, borosilicate glass, or flint glass.

As opposed to the cylindrical structure 115, the system 200 of FIG. 2 includes a cylindrical structure 215. The cylindrical structure 215 is polymer membrane or foil filled with a powdered/granular material for compaction. The pre-form powder material can also contain ceramic particles such as boron nitride, silica, alumina, and silicon carbide, and particles of cobalt and nickel. Particles of lower melting point alloys, such as aluminum and tin may be included to facilitate and preserve high hardness polymorphs formed during glass shock loading of a silicate pre-form. According to an embodiment of the invention, the powdered/granular material may also include fiber materials. The cylindrical structure 215 may be used as an industrial part in a mechanical operation, for example, and thus may be sized in accordance with the application.

The striker assembly 130 of FIG. 2 has a flat backing portion 135. FIG. 2 also shows one or more protrusion portions 240 extending from the flat backing portion 135. As shown the protrusion portion 240 has a rectangular profile/section with a flat head 241 for impacting the glass. It should be understood, that there may be alternative configurations for the protrusion portion 240. Thus, the protrusion portion configurations 140, 150, and 160 as shown in FIGS. 1A, 1D, and 1E, are all applicable to the embodiment of FIG. 2. The different embodiments for the protrusions are used according to requirements for controlling the level and timing of the explosive wave. For example, the protrusion portion 240 with the flat head 241 is preferred for striking embodiments in which the glass sleeve 120 is made up of densely packed glass.

In operation, the protrusion portion 240 (or any other of the protrusion portions outline above strike the cylindrical structure 215 at a high velocity, which as outlined above with respect to FIGS. 1A-1E creates intense pressurization forces on the cylindrical structure 215. As outlined above with respect to FIGS. 1A-1E, volume expansions due to Reynolds Dilatancy and the formation of failure waves, and also the creation of coesite or stishovite or seifertite and the accompanying volume change, within the confined space serves to pressurize the cylindrical structure 215, thereby hardening and compacting the cylindrical structure 215. As with the embodiments outlined with respect to FIGS. 1A-1E, greater pressures produce greater compacting.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention. For example, gears, brackets, and bearings may also be treated according to the principles outlined in the instant invention. The invention including the stated variations is intended to be defined by the following claims and their equivalents, in which all terms are meant in their broadest reasonable sense unless otherwise indicated.

What is claimed is:

1. A system for hardening and compacting a cylindrical structure, the system comprising:
    a confinement assembly comprising:
        a cylindrical structure having a longitudinal axis;
        a glass sleeve surrounding and contacting the cylindrical structure; and
            a rigid outer shell encasing the glass sleeve and the cylindrical structure therewithin;
        a striker assembly comprising:
            a flat backing portion; and
            a protrusion portion extending from the flat backing portion;
        a launching mechanism for launching and directing the striker assembly in a direction substantially parallel to the longitudinal axis, to shatter the glass of the glass sleeve to create an explosive volume expansion of the glass, which due to the confinement assembly results in compressive forces being applied to the surface of the cylindrical structure, thereby hardening and compacting the cylindrical structure.

2. The system for surface hardening and compacting a cylindrical structure of claim 1, wherein the launching mechanism comprises one of a projectile component, or an explosive charge for launching and directing the striker assembly towards the confinement assembly at velocities between 500 feet per second to 20,000 feet per second, so that upon impact, one or more of the following occurs: a. multiple cracks form in the glass sleeve so that the volume occupied by glass in the glass sleeve increases as the cracks rupture and expand; b. failure waves propagate through the glass sleeve with kinetic energy stored ahead of the waves; c. the glass sleeve develops at least one of coesite, stishovite, or seifertite which rupture and convert to an amorphous state through a volume change; so that the occurrences of one or more of a, b, or c, creates said explosive volume expansion of the glass, which results in said compressive forces being applied to the surface of the cylindrical structure.

3. The system for surface hardening and compacting a cylindrical structure of claim 2, wherein the protrusion portion has a triangular profile with a pointed tip for impacting the glass sleeve.

4. The system for surface hardening and compacting a cylindrical structure of claim 2, wherein the protrusion portion has a stepped profile with two or more steps for impacting the glass sleeve.

5. The system for surface hardening and compacting a cylindrical structure of claim 3, wherein the cylindrical structure is a shaft.

6. The system for surface hardening and compacting a cylindrical structure of claim 4, wherein the cylindrical structure is a shaft.

7. The system for surface hardening and compacting a cylindrical structure of claim 2, wherein the cylindrical structure comprises a cylindrical membrane or foil filled with powdered or granular ceramic materials.

8. The system for surface hardening and compacting a cylindrical structure of claim 7, wherein the protrusion portion has a rectangular profile with a flat head for impacting the glass sleeve.

9. A method of hardening and compacting a cylindrical structure, the method comprising:
    providing a confinement assembly comprising:
        a cylindrical structure having a longitudinal axis;
        a glass sleeve surrounding and contacting the cylindrical structure; and
            a rigid outer shell encasing the glass sleeve and the cylindrical structure therewithin;
        providing a striker assembly comprising:
            a flat backing portion; and
            a protrusion portion extending from the flat backing portion;
    directing the striker assembly towards the confinement assembly in a direction substantially parallel to the longitudinal axis, so that the protrusion portion strikes the glass sleeve, to shatter the glass of the glass sleeve, thereby creating an explosive expansion of the glass, wherein due to the limited space within the confinement assembly, compressive forces are created and applied to the surface of the cylindrical structure, thereby accomplishing said hardening and compacting of the cylindrical structure.

10. The method of surface hardening and compacting of claim 9, wherein in the directing of the striker assembly towards the confinement assembly, the striker assembly is directed towards the confinement assembly at velocities between 500 feet per second to 20,000 feet per second, so that upon impact, one or more of the following occurs: a. multiple cracks form in the glass sleeve so that the volume occupied by glass in the glass sleeve increases as the cracks rupture and expand; b. failure waves propagate through the glass sleeve with kinetic energy stored ahead of the waves; c. the glass sleeve develops at least one of coesite, stishovite, or seifertite which rupture and convert to an amorphous state through a volume change; so that the occurrences of one or more of a, b, or c, creates said explosive volume expansion of the glass, which results in said compressive forces being applied to the surface of the cylindrical structure.

11. The method of surface hardening and compacting of claim 10, wherein in the providing of the striker assembly, the protrusion portion is provided with one of, a triangular profile with a pointed tip for impacting the glass sleeve, or a stepped profile with two or more steps for impacting the glass sleeve.

12. The method of surface hardening and compacting of claim 11, wherein in the providing of the confinement assembly, the cylindrical structure is a shaft.

13. The method of surface hardening and compacting of claim 10, wherein in the providing of the confinement assembly, the cylindrical structure is a cylindrical membrane or foil filled with powdered or granular ceramic materials.

14. The method of surface hardening and compacting of claim 13, wherein in the providing of the striker assembly, the protrusion portion has a rectangular profile with a flat head for impacting the glass sleeve.

* * * * *